United States Patent Office 3,441,531
Patented Apr. 29, 1969

3,441,531
VINYLIDENE FLUORIDE POLYMER DISPERSIONS HAVING LOW VISCOSITY
Francis Frederick Koblitz, Erdenheim, and Robert Gabriel Petrella, Philadelphia, Pa., assignors to Pennsalt Chemicals Corporation, Philadelphia, Pa., a corporation of Pennsylvania
No Drawing. Filed Jan. 17, 1966, Ser. No. 520,849
Int. Cl. C08f 47/20, 47/18; C09d 3/78
U.S. Cl. 260—29.1                                           5 Claims

ABSTRACT OF THE DISCLOSURE

The viscosity of a polymeric dispersion comprising particulate polyvinylidene fluoride dispersed in organic latent solvent is reduced by mixing therewith from about 0.01 to about 2 parts by weight of a quaternary ammonium salt cationic surfactant per 100 parts by weight of dispersion solids. The decreased viscosity permits higher solids content dispersions, gives improved flow and leveling characteristics and improved wetting of pigments and substrates, all of which results in the attainment of better coatings from the dispersions.

---

This invention relates to low viscosity dispersions of vinylidene fluoride polymer in latent solvent systems. More particularly, this invention concerns polymeric dispersions comprising vinylidene fluoride polymer dispersed in an organic latent solvent therefor and containing in admixture at least one cationic surfactant which is a quaternary ammonium salt (i.e., a salt of a quaternary nitrogen base).

The vinylidene fluoride polymers embodied in the compositions of this invention are well known resins. A brief but comprehensive survey of polymerization techniques used in preparing vinylidene fluoride polymers is found in the specification of U.S. Patent No. 3,193,539 to M. Hauptschein. The terms "vinylidene fluoride polymer" and "polyvinylidene fluoride" used herein refer not only to the homopolymer of vinylidene fluoride, but also to the vinylidene fluoride copolymers containing at least about 75 mol percent of vinylidene fluoride. Suitable comonomers are the halogenated ethylenes such as sym.-dichlorodifluoroethylene, 1-chloro-1,2,2-trifluoroethylene, tetrafluoroethylene, vinyl fluoride, vinyl chloride and the like. When at least about 75 mol percent of vinylidene fluoride is present, the important chemical resistance, resistance to the deteriorative effects of the sun and weather, and mechanical characteristics of the copolymers of vinylidene fluoride are essentially the same as the homopolymer.

Polyvinylidene fluoride is very useful as a protective coating for a variety of substrates due to said good chemical and weathering resistance and its thermal stability. A general technique used for preparing films and coatings of the polymer is to prepare a non-aqueous dispersion of polyvinylidene fluoride in an organic latent solvent, which dispersion is applied by spraying, dip coating, by doctor blade, reverse roll coating, etc., to a substrate that may be metal, cloth, plastic, wood, glass, etc. The coated material is inserted in an oven and dried (cured) at from about 120° C. to about 320° C.

The aforesaid dispersions are prepared by mixing substantially water-free powdered vinylidene fluoride polymer and a latent solvent in a mixing apparatus. Suitable apparati for this purpose include a paint mill, sand mill, ball mill, rod mill, or a high-shear blending unit. The term "latent solvent" as used herein is defined as an organic liquid having a boiling point (at atmospheric pressure) above about 50° C., preferably about 110–300° C., which liquid has no significant solvent or swelling action on polyvinylidene fluoride at room temperature, but at an elevated temperature exerts a solvent action sufficient to cause the vinylidene fluoride polymer particles to coalesce. Representative latent solvents include tetraethylurea, dimethyladipate, diethyladipate, diethylsuccinate, dimethylphthalate, diethylphthalate, diethyloxalate, triethylphosphate, diethylformamide, dimethylsebacate, dimethylsuccinate, propylene carbonate, ethylene carbonate, gamma butyrolactone, 2-nitropropane, acetone, 4-methoxy-4-methyl pentanone-2, isophorone, methyl ethyl ketone, cyclohexanone, 2-methoxyethylacetate, 2-butoxyethylacetate, 2-ethoxyethylacetate, diethylene glycol monoethyl ether acetate, hexylacetate, diacetone alcohol and others well known in the art. In general, the quantity of the latent solvent in the polymeric dispersion will be in the range of from about 80 to about 300 parts by weight per 100 parts by weight of polyvinylidene fluoride. Obviously, the viscosity of the polymeric dispersion is decreased as the relative proportion of latent solvent therein is increased. If desired, other organic volatile diluents which have no latent solvating action on the vinylidene fluoride polymer may be added to reduce the dispersion viscosity and to improve the flow characteristics. The amount of the volatile diluent may be as much as up to about 100 parts per 100 parts by weight of the polyvinylidene fluoride. Examples of such non-solvent diluents are xylene toluene, diisobutylketone, aliphatic naphthas, aromatic naphthas, methyl isobutyl carbinol and others well known in the art.

The primary particle sizes of the particulate polyvinylidene fluoride in the dispersions are, in general, within the range of about 0.05 micron to about one micron in diameter. However, these particles are present in the dispersion as agglomerates containing from one to about 25 primary particles, preferably from one to 10 particles per agglomerate.

A disadvantage of the aforedescribed polyvinylidene fluoride dispersions is their highly viscous nature. For example, when the dispersions are sprayed onto substrates, high viscosity causes spattering and uneven coatings; when the dispersions are applied by roll or knife coating equipment, high viscosity and the consequent poor flow and leveling characteristics result in unacceptable coatings having flow lines and void spots. The practice of adding an aforementioned non-solvent to the dispersion or incorporating a proportionately large amount of latent solvent therein is an inefficient way to reduce the viscosity because, in order to appreciably lower the viscosity by this means, a relatively very large amount of the diluent is required; this excess of diluent reduces the thickness of the coating thereby necessitating extra coating applications to obtain the desired thickness; an excess of diluent also leads to additional problems in drying the coatings and recovering the solvent.

It has now been discovered, in accordance with this invention, that a polymeric dispersion, as described above, comprising the dispersed vinylidene fluoride polymer, the latent solvent, and, optionally, a minor amount of the volatile non-solvating diluent, and varying amounts of optional pigments and fillers, exhibits a marked decrease in viscosity when a small amount of quaternary ammonium salt cationic surface active agent is incorporated therein. The polyvinylidene fluoride dispersions of this invention have viscosity values which are only small fractions of the viscosity values of the same dispersions which do not contain a quarternary ammonium salt surfactant. This decreased viscosity results in the advantages of achieving higher solids-content dispersions, improved flow and leveling characteristics, improved wetting of both pigments and substrates, all of the aforesaid advantages contributing to the attainment of better coatings. It is understood that the compositions of this invention are subject to many modifications and variations without departing from the scope thereof. For example, the polymeric dispersions can have incorporated therein any of the wide varieties of fillers, pigments, organic polymeric modifiers and other additives well known in the art of vinylidene fluoride resin compounding. The most often used pigment in titanium dioxide, usually in an amount of from about 30 to about 100 parts by weight per 100 parts of the vinylidene fluoride polymer. Other examples of pigments and tinting aids are carbon black, zinc oxide, zinc sulfide, chrome oxide and the phthalocyanines.

This unique action of the cationic surfactant (reducing the viscosity of the polyvinylidene fluoride dispersions) is surprising in view of the discovery that both anionic and nonionic surfactants are usually found unsuitable for this purpose; a surfactant taken from either of these latter classes and incorporated into the polymer dispersions generally provides negligible or inadequate viscosity depression.

The cationic surfactants embodied in the polymer dispersions according to this invention are the salts of quaternary nitrogen bases (i.e., quaternary ammonium salts) having the general formula

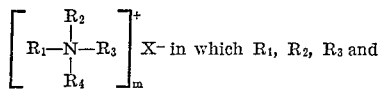

$R_4$ are independently selected organic radicals, each having a carbon-nitrogen linkage to the nitrogen atom, X is an anion whose valence is from one to three and $m$ is an integer of one to three which indicates the molar proportions of the cation and anion required to form the respective salt (i.e. $m$ corresponds to the valence of anion X). Preferred cationic surfactant salts are those in which the organic radicals $R_1$, $R_2$, $R_3$ and $R_4$ are independently selected from the group consisting of alkyl, alkylamide, alkenyl, hydroxyalkyl, arylalkyl and alkylaryl radicals of 1 to 24 carbon atoms and heterocyclic groups of 4 to 10 carbon atoms in which from 2 to 3 of the nitrogen valences are shared by two carbon atoms in a single heterocyclic group. More preferably, the total number of carbon atoms in the cationic portion of the quaternary nitrogen base is from about 20 to about 40 carbon atoms. In other words, the well known cationic quaternary nitrogen-containing surfactants embodied herein are formed by salts of estra-substituted ammonium bases and by salts of heterocyclic nitrogen bases such as pyridinium, quinolinium, isoquinilinium, morpholinium, piperidinium, imidazolinium, and other like quaternary nitrogen containing bases. The anion X can be a halide, i.e. chloride, bromo, fluoride, or iodide, a nitrate ($NO_3-$), a methosulfate ($SO_4CH_3-$), an ethosulfate ($SO_4C_2H_5-$), a methanesulfonate, an ethanesulfonate, a sulfate ($SO_4=$), a phosphate ($PO_4\equiv$), and the like ions. Of the monovalent anions chloride and nitrate anions are preferred, and of the polyvalent anions the sulfate anion is preferred.

Representative of the numerous cationic surfactants which can be used, to mention but a very few, are Cetyltriethylammonium chloride
Diethylmethyl-(2-oleoamidoethyl)ammonium methyl sulfate
Cetyl trimethylammonium bromide
Dimethyl distearyl ammonium chloride
Octadecyltrimethylammonium chloride
Stearamidopropyldimethyl-β-hydroxyethylammonium nitrate
Stearamidopropyldimethyl-β-hydroxyethylammonium dihydrogen phosphate
N,N-dimethyl-N-benzyl-N-octadecyl ammonium chloride
N,N-dimethyl-N-hydroxyethyl-N-dodecyl ammonium chloride
N,N-dimethyl-N-benzyl-N-octadecenyl ammonium chloride
N,N-dimethyl-N-benzyl-N-dodecyl ammonium chloride
N,N-dimethyl-N-hydroxyethyl-N-benzyl ammonium chloride
Hexadecyl pyridinium chloride
Hexadecyl triethyl ammonium bromide
Octadecylbenzyl trimethyl ammonium methosulfate
Isopropylnaphthyl trimethyl ammonium chloride
Octadecyl pyridinium bromide
1-(2-hydroxyethyl)-2-heptadecenyl-1-(4-chlorobutyl) imidazolinium chloride
Hexadecyl methyl piperidinium methosulfate
Dodecyl hydroxyethyl morpholinium bromide
N-cetyl-N-ethyl morpholinium ethosulfate Cationic surfactants of the type used in the compositions of this invention are described in the "Encyclopedia of Chemical Technology," Kirk and Othmer, vol. 13, 1950, Table I, pages 515–517, and on pages 528–530. Commercially available cationic surfactants are catalogued in "Detergents and Emulsifiers," John W. McCutcheon, Inc., 1965.

The amount of the cationic surfactant used in the polymer dispersions to reduce the viscosity thereof is within the range of about 0.01 to about two parts per 100 parts by weight of dispersion solids, preferably from about 0.05 to about 0.1 part per 100 parts of the dispersion solids. It has been found, however, that using more than about one part of surfactant results in a polymer dispersion having poor adhesion when employed as a coating on metal substrates, and therefore this amount is seldom exceeded.

The examples that follow serve to illustrate and clarify the invention, as well as to point out the specificity of the cationic surfactant compared to the inoperability of the anionic and nonionic types. The amounts of ingredients are given in weight percent unless otherwise stated.

EXAMPLE 1

A. Control experiment

Particulate polyvinylidene fluoride having an agglomerate particle size distribution within the range of about 1 to 3 microns was mixed with a 4:1 mixture of dimethyl phthalate and diisobutyl ketone to form a dispersion containing 38% solids by weight, employing 6 minutes of mixing in a high-shear, 16,000 r.p.m. "Waring Blendor" mixer. The viscosity of the resulting dispersion, as measured in a Brookfield Viscometer, Model LVT, type TE spindle, was 120,000 centipoises (cp.) at 75° F. The dispersion was thick and contained many gel lumps. Films, 2 to 3 mils thick, were cast from the dispersion by using a doctor blade with a 0.020 inch gap to draw down wet films 15 to 20 mils thick on a polished chrome-plated brass plate. The films were cured at 350° F. for 20 minutes and at 400° F. for 10 minutes, respectively, in a circulating hot air oven. The films in both cases had many gel lumps and were unsatisfactory.

Dispersions were prepared as above using the following recipes:

EXPERIMENTS B, C AND D

| B | C | D |
|---|---|---|
| 50% polyvinylidene fluoride. | 50% polyvinylidene fluoride. | 50% polyvinylidene fluoride. |
| 40% dimethylphthalate. | 50% carbitol acetate. | 40% dimethylphthalate. |
| 10% diisobutyl ketone. | 0.05% cationic surfactant.¹ | 10% of 4-methoxy-4-methyl pentanone. |
| 0.05% cationic surfactant.¹ | | 0.05% cationic surfactant.¹ |

¹ Catonic surfactant was

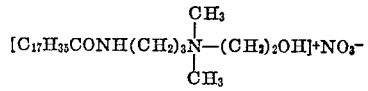

0.05% thereof is based on weight of polyvinylidene fluoride.

The dispersions B, C, and D were smooth and free of grit and gel lumps. Viscosities were 4331 cp., 1328 cp. and 4165 cp., respectively. All films cast therefrom and cured as described in Experiment A were smooth and transparent with a slight crystalline haze.

EXAMPLE 2

Particulate polyvinylidene fluoride having an agglomerate particle size distribution within the range of about 1 to 3 microns was mixed with solvents to form a dispersion using a ball mill revolving for 16 hours at 29 r.p.m. consisting of a 1 qt. jar containing 9 lb. of "Burundum" cylinder. The recipe (E) was as follows:

|  | Percent |
|---|---|
| Polyvinylidene fluoride | 50 |
| Carbitol acetate | 30 |
| Dimethyl phthalate | 10 |
| 4-methoxy-4-methyl pentanone-2 | 10 |

The dispersion was smooth but its viscosity was 586,000 cp.

A dispersion (sample F) was prepared having the same recipe as above, except that 0.02% of the cationic surfactant described in Example 1 (based on the weight of the dispersion solids) was added prior to the ball mill grinding. The viscosity of the smooth dispersion which resulted was reduced to 48,000 cp. by the addition of the surfactant.

EXAMPLE 3

In this series of experiments the recipe comprised 50% of polyvinylidene fluoride (agglomerate particle size distribution of 1 to 3 microns), 40% of dimethyl phthalate, 10% diisobutyl ketone and a small amount of a surfactant, except that in the case of the control sample G, no surfactant was added. The dispersions were prepared in an "Oster" blender at 114° F. with 10 minutes of mixing at 17,000 r.p.m.; said blender consists of a one liter ribbed glass jar of square cross-section with a 2.25 inch diameter, four-bladed cutting assembly at the bottom. The data and results are set forth below in Table I.

TABLE I

| Exp. | Surfactant [1] | Viscosity of dispersion (cps.) |
|---|---|---|
| G | None | >500,000 |
| H | 0.5% Dow Corning No. 200 silicone oil (nonionic surfactant). | 200,000–400,000 |
| J | 0.2% of sodium salt of dioctyl sulfo succinate (anionic surfactant). | 100,000–150,000 |
| K | 0.2% of $C_7P_{15}COONH_4$ (anionic surfactant). | 37,000 |
| L | 0.2% of "Polyethylene Glycol 400 laurate" (nonionic surfactant). | >500,000 |
| M | 0.1% of 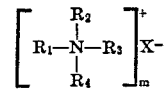 (cationic surfactant) | <5,000 |
| N | 0.2% of "Onyx BTC" (cationic surfactant): mixed n-alkyl ($C_{12}$–$C_{18}$) dimethyl benzyl ammonium chloride. | 642 |

[1] Percent by weight based on weight of dispersion solids.

EXAMPLE 4

Two polymeric dispersions, designated Samples Q and R, were prepared using a standard three roller paint mill. The dispersions were comprised of:

|  | Parts |
|---|---|
| Polyvinylidene fluoride | 74.5 |
| Carbitol acetate | 62.5 |
| Butyrolactone | 31.5 |
| Dimethyl phthalate | 31.5 |
| Titanium dioxide pigment | 50.0 |

To sample R was added 0.5 part of a cationic surfactant having the formula

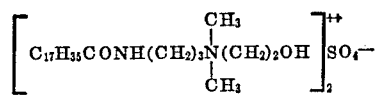

however, no surfactant was added to Sample Q (the control). The dispersions were ground on the mill until a fineness of grind No. 6 was obtained on the Hegman fineness of grind gage. Each dispersion was diluted to 40% solids by the addition of more butyrolactone and the viscosities were measured with a Brookfield model LVT Viscometer, No. 4 spindle at 6 r.p.m. as:

| Sample: | Cp. |
|---|---|
| Q | 33,000 |
| R | 5,300 |

It is understood that the foregoing examples serve to illustrate the invention and are not meant to limit the scope thereof as defined by the appended claims.

We claim:

1. A polymeric dispersion comprised of 100 parts by weight of solid particulate polyvinylidene fluoride dispersed in from about 80 to about 300 parts by weight of an organic latent solvent for the polyvinylidene fluoride and in admixture therewith from about 0.01 to about 2 parts by weight per 100 parts by weight of dispersion solids of a cationic surfactant of the formula $$\left[ \begin{array}{c} R_2 \\ R_1-N-R_3 \\ R_4 \end{array} \right]^+_m X^-$$

in which $R_1$, $R_2$, $R_3$ and $R_4$ are organic radicals independently selected from the group consisting of alkyl, alkylamide, alkenyl, hydroxyalkyl, arylalkyl and alkylaryl radicals of 1 to 24 carbon atoms, and heterocyclic groups of 4 to 10 carbon atoms in which from 2 to 3 of the nitrogen valences are shared by 2 carbon atoms in a single heterocyclic group, the total number of carbon atoms in the cationic portion of said cationic surfactant being from about 11 to about 40 carbon atoms, X is an anion whose valence is from 1 to 3 selected from the group consisting of chloride, bromide, fluoride, iodide, nitrate, methosulfate, ethosulfate, methanesulfate, ethanesulfate, sulfate and phosphate, and $m$ is an integer of one of three equal to the valence of anion X.

2. A polymeric dispersion according to claim 1 wherein the cationic surfactant is

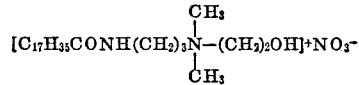

3. A polymeric dispersion according to claim 1 wherein the cationic surfactant is

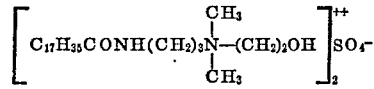

4. A polymeric dispersion according to claim 1 wherein the cationic surfactant is mixed n-alkyl($C_{12}$–$C_{18}$) dimethyl benzyl ammonium chloride.

5. A polymeric dispersion according to claim 1 wherein the cationic surfactant is from about 0.01 to about one part per 100 parts by weight of dispersion solids.

(References on following page)

References Cited

UNITED STATES PATENTS

| | | |
|---|---|---|
| 3,324,069 | 6/1967 | Koblitz. |
| 2,507,688 | 5/1950 | Armstrong. |
| 3,211,687 | 10/1965 | Capron _____ 260—30.8 |
| 3,193,539 | 7/1965 | Hauptschein _____ 260—87.7 |
| 2,435,537 | 2/1948 | Ford _____ 260—92.1 |
| 3,169,120 | 2/1965 | Capron _____ 260—92.1 |
| 3,154,519 | 10/1964 | Iserson _____ 260—30.8 |

OTHER REFERENCES

Penn PVC Technology, pp. 326, 327 (1962).

ALLAN LIEBERMAN, *Primary Examiner.*

U.S. Cl. X.R.

260—30.4, 30.6, 31.8, 31.2, 32.4, 32.6, 32.8, 32.2, 31.4, 33.4, 33.6